June 18, 1957     R. L. ATKINSON     2,796,303
ENDLESS TRACKS FOR SELF-LAYING TRACK TYPE VEHICLES
Original Filed June 15, 1955     4 Sheets-Sheet 1
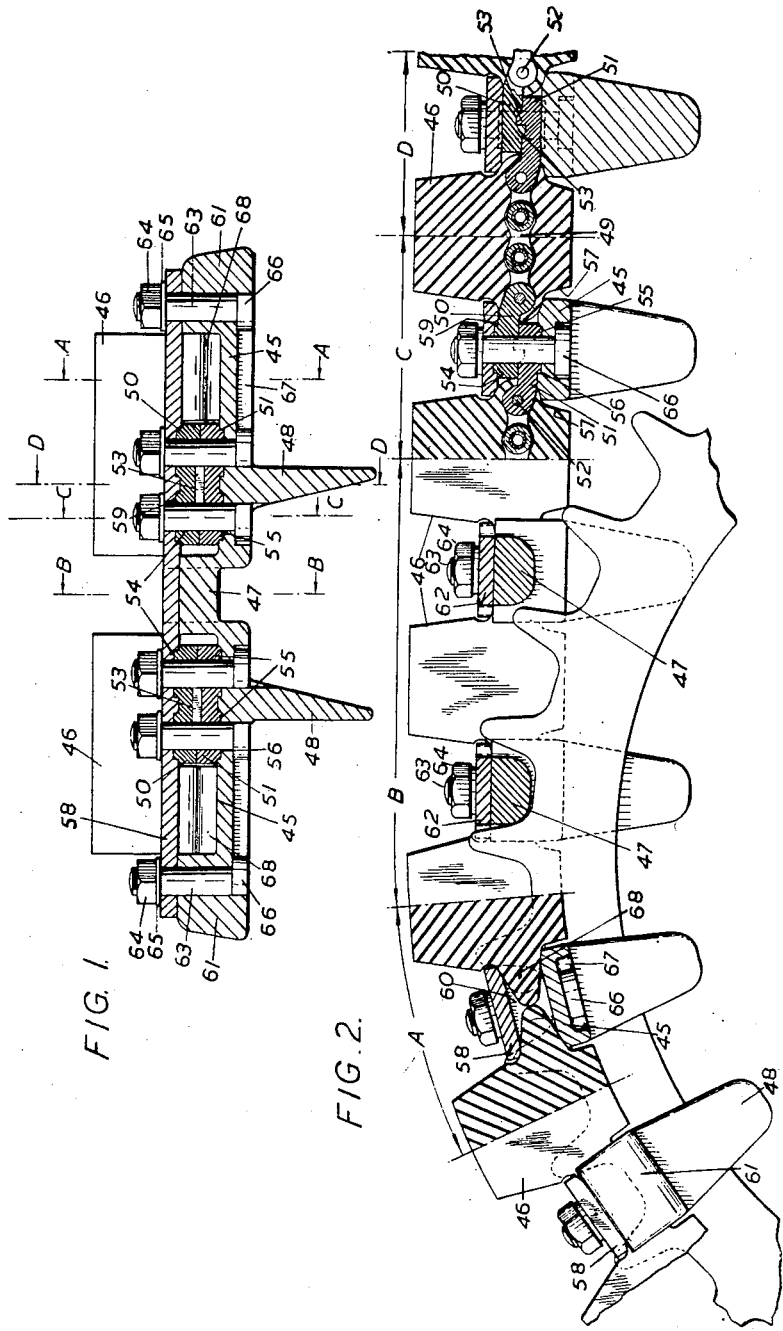
Inventor:
RICHARD LESLIE ATKINSON
By
Richardson, David and Nordon
Attorneys.

June 18, 1957  R. L. ATKINSON  2,796,303
ENDLESS TRACKS FOR SELF-LAYING TRACK TYPE VEHICLES
Original Filed June 15, 1955  4 Sheets-Sheet 2
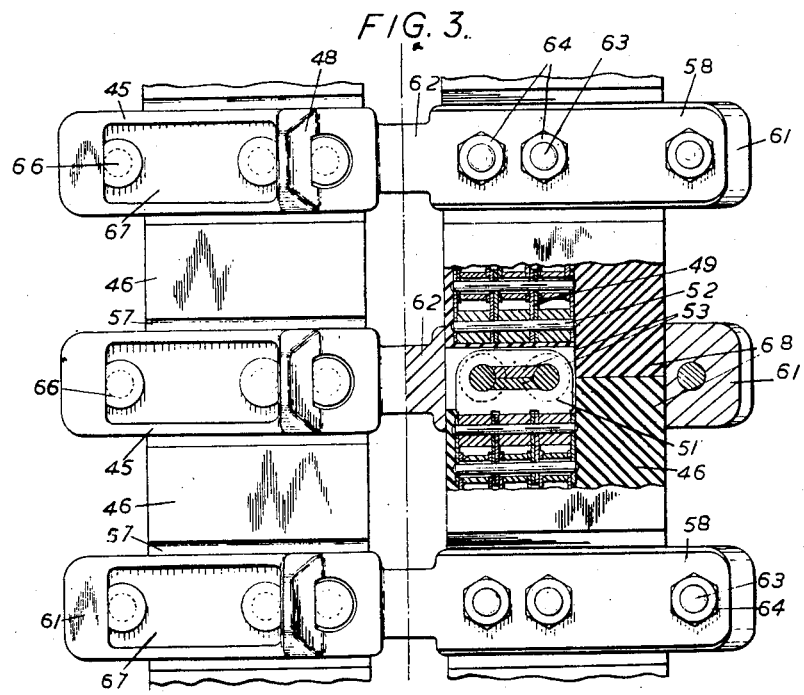
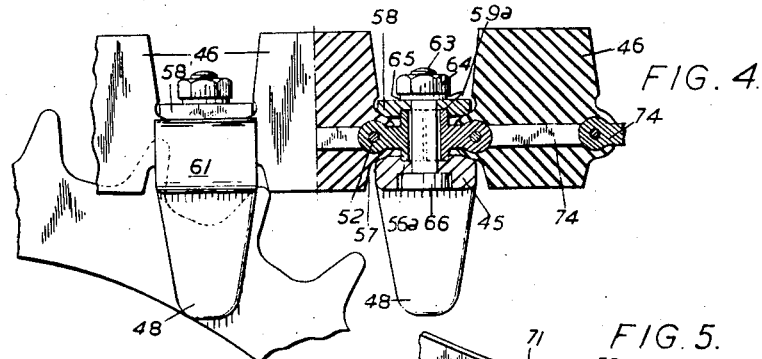
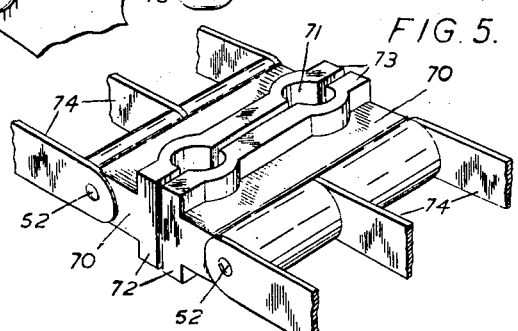
Inventor:
RICHARD LESLIE ATKINSON
By
Richardson, David and Nordon
Attorneys.

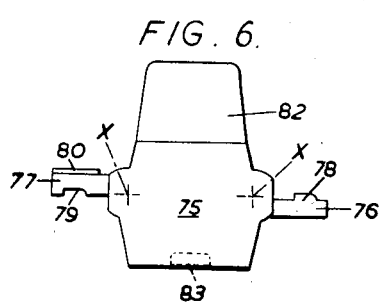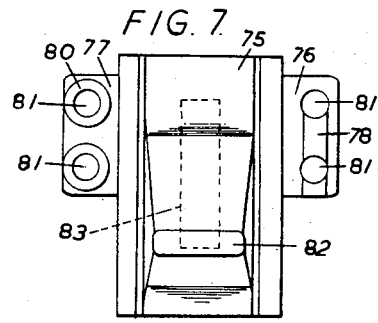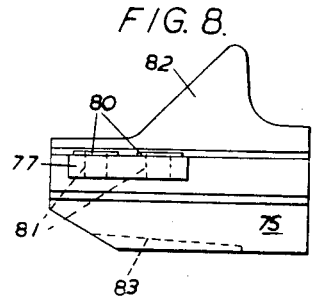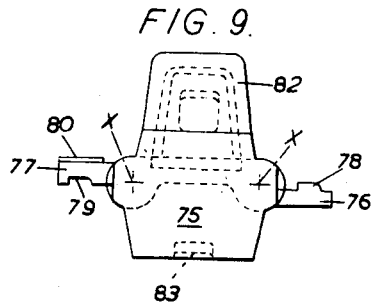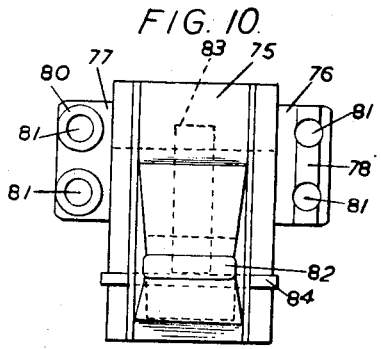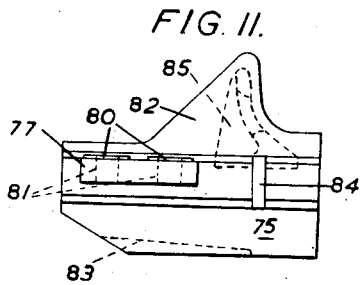
Inventor:
RICHARD LESLIE ATKINSON

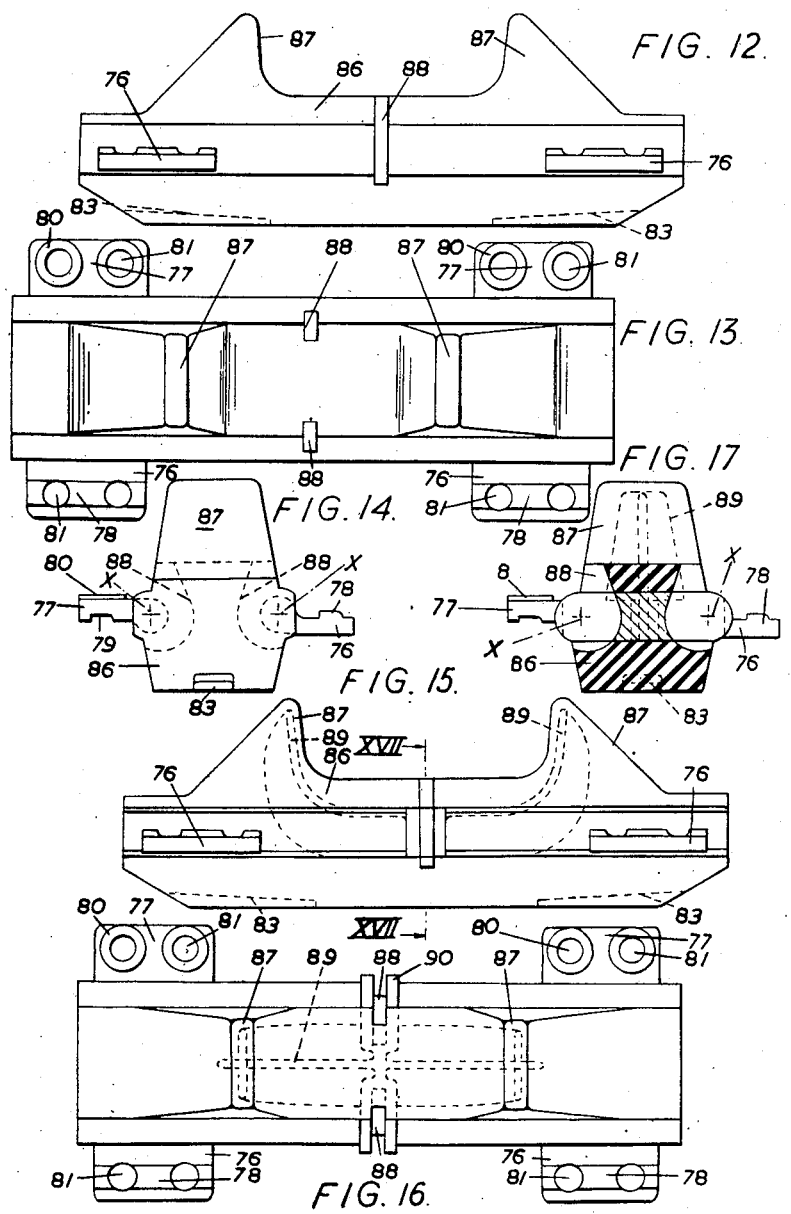

United States Patent Office 2,796,303
Patented June 18, 1957

1

2,796,303

ENDLESS TRACKS FOR SELF-LAYING TRACK TYPE VEHICLES

Richard L. Atkinson, Brookside, Read, near Burnley, England, assignor to Atkinson's Agricultural Appliances Limited, Clitheroe, Lancashire, England, a British company Original application June 15, 1955, Serial No. 515,700. Divided and this application February 28, 1956, Serial No. 568,392

Claims priority, application Great Britain July 21, 1954

11 Claims. (Cl. 305—10)

The present application is a continuation-in-part of my presently abandoned formerly copending application Serial Number 403,351 filed January 11, 1954, and a division of my copending application Serial Number 515,700 filed June 15, 1955.

This invention relates to endless tracks for self-laying track vehicles, and more especially to endless tracks which comprise a series of transversely-extending, rigid track members or driving bars alternating in the longitudinal direction with one or more longitudinally-extending series of transversely-extending pads of rubber, with flexible non-extensible members embedded therein, the rigid track members or driving bars being interconnected with the pads by bolts through the medium of the tension members in the pads. The term "rubber" where used in this specification and in the claims appended thereto is to be construed as embracing natural and synthetic rubbers and other such tough resilient moisture-proof materials of a rubbery nature suitable for the purpose of the invention.

Provision has had to be made in endless tracks in general against the tendency of the track to slip in the lateral direction and it has been proposed heretofore to prevent such lateral slip by providing co-operating formations on successive rigid track members or driving bars which formations in the case of power-operated sprocket-driven tracks have taken the form of plate-like walls flanking the sprocket-engaging portion of track and projecting fore and aft of each rigid track member or driving bar, the slip-preventing walls being joggled or offset in the longitudinal direction to nest one within the other successively.

In tracks of the construction aforesaid the bolts which secure the tension members to the rigid track members have heretofore been subjected to considerable shear stress in the running or longitudinal direction and it has been necessary to utilise bolts of relatively large diameter to withstand such stress for as long a running period as possible. Notwithstanding the provision per track element for each series of pads of two transverse series of bolts of considerable resistance to shear, shearing of the bolts has frequently occurred. This disadvantage has been offset to some extent in tracks of the construction aforesaid, as the bolts can be readily replaced.

An object of the present invention is to minimize shear stress on the bolts in tracks of the construction aforesaid, and to minimize any tendency toward lateral slip in such tracks.

The present invention involves an endless track comprising a series of transversely-extending, rigid track members or driving bars, at least one series of longitudinally and transversely-extending pads of rubber alternating in the longitudinal direction of the track with said driving bars and interlinked with the latter through the medium of substantially non-extensible flexible tension

2 members embedded in the pads to provide for relative hinging movement about at least one transverse axis between successive bars and pads, complementary interengaging means interlocking the end portions of the tension members together and with the driving bars against relative movement with respect to one another at least in the lateral direction and preferably also in the longitudinal direction of the track, and means securing the driving bars and tension members together in their assembled interlocked condition. These interengaging interlocking end portions of the tension members constitute tension-absorbing portions thereof which relieve the bolts or other fastening devices of the necessity of withstanding shear stresses during the running of the track. These tension-absorbing portions engagingly connect the tension member end portions and one of the rigid track members together preventing relative movement thereamong in all directions parallel to the normally flat inner surfaces of the resilient pads without subjecting the bolts to stresses other than tensile stresses.

The pads of each series are arranged with the end portions of the tension member of each pad projecting from the pad at opposite ends thereof forming inner and outer connecting blocks. The inner connecting block of each pad of the series overlaps the outer connecting block of one of the pads which is adjacent thereto. Correspondingly, the outer connecting block of each pad underlies and is overlapped by the inner connecting block of the other adjacent pad. The inner surfaces of the series of pads and those of the series of rigid driving bars form at least one effectively smooth, continuous track surface for load supporting and guiding engagement with the bogie wheels of the vehicle. This smooth track surface is intermittently but insignificantly interrupted to provide smooth and continuous support for the bogie wheels on one side of a self-laying track vehicle, and a pair of guide elements are provided flanking each lane where it traverses each rigid bar and possibly also each pad, said guide elements extending inwardly beyond the surfaces of the bars and pads and presenting substantially vertical spaced guide faces towards the bogie wheels.

The guide elements may be integral with or otherwise made unitary with the bars and pads. The guide elements when provided on the pads may conveniently be formed of rubber and be moulded with the pads. They may, moreover, be reinforced internally, for example by metal inserts embedded in the rubber.

The guide elements serve to guide the track in a true rectilinear direction under the bogie wheels of a self-laying track vehicle and resist lateral displacement of the track from its true path even under adverse circumstances such as occur, for example, when a self-laying track vehicle makes an abrupt turn and the surface over which the vehicle is running is of a soft or sticky nature affording substantial adhesion to the track.

By virtue of the keying or interlocking of the interengaging end portions of the tension member and the rigid driving bars, the longitudinally directed tensile stresses produced in the course of running of the track are transmitted through and absorbed by the interengaging end portions of the tension members and the driving bars, the bolts thus being required to withstand only tensile stresses.

The tension members in the pads of each series overlap one another successively below each successive driving bar and the end portions of the tension members at each overlapping region may advantageously be keyed together and to the driving bar, or interlocked with one another and with the driving bars, whereby a single transverse series of bolts may be utilised to interconnect the tension members of each successive pair of pads with each other and with the driving bars at each overlapping region.

The tension members extend over the outer or bogie-wheel-remote surfaces of the driving bars, and a plate preferably extends laterally across the surface of the tension member or pad reinforcement remote from each driving bar, being keyed to or interlocking with said surface and forming with the driving bar a box construction into which the end portions of the tension members or pad reinforcements pass and within which they are locked by the interengaging keying or interlocking formations.

Alternatively the end portions of the tension members adjacent pads may abut one another and be sandwiched between the driving bar and a track plate co-operating therewith, the tension members or pad reinforcements at the abutting region being provided at the driving bar and plate-adjacent surfaces with projections and/or recesses co-operating with recesses and/or projections provided in and/or on the driving bar and plate, whereby the bolts have the sole function of holding the co-operating parts sandwiched together and the shear stresses set up in running of the track are transmitted through and absorbed by the driving bars, the plates and the tension members or pad reinforcements.

The forces set up in running the tracks of the present invention are therefore transmitted through and absorbed entirely by the tension members and the driving bars, and the plates where provided, and the bolts are required to withstand tensile stresses only as their sole function is to interconnect the reinforcements or tension members with the driving bars, and the plates where provided.

Snaking or lateral slip of the track is also prevented by the construction of the present invention, and hence the drive-sprocket co-operating formations on the driving bars need not be complicated by plates designed to prevent lateral slip.

Certain preferred embodiments of the invention will now be described, by way of example, with reference to the accompanying drawings, in which:

Fig. 1 is a transverse vertical section through the upper run of an endless track according to one embodiment of the invention;

Fig. 2 is a side elevation of a section of the upper run of the endless track of Fig. 1, showing four vertical sections in different planes on the lines A—A, B—B, C—C and D—D of Fig. 1;

Fig. 3 is a half plan view looking on the inner or bogie-wheel-adjacent face, half reverse plan view looking on the outer or bogie-wheel-remote face, of a section of the endless track of Figs. 1 and 2, part of the reverse plan being broken away to show a part in horizontal section;

Fig. 4 is a side elevation, partly in section, of a length of the upper run of a modified form of the track;

Fig. 5 is a perspective view of a detail of the track shown in Fig. 4 illustrating the end portions of adjacent tension members of two adjacent pads;

Figs. 6 to 11 illustrate modified pads for an endless track in accordance with the embodiment illustrated in Figs. 1 to 3, Figs. 6 to 8 being, respectively, a side elevation, a plan view and an end elevation of a rubber pad with a flexible, non-extensible member embedded therein and provided with a non-reinforced guide plate or element, and Figs. 9 to 11 being similar views of a rubber pad with a flexible, non-extensible member embedded therein and provided with an internally-reinforced guide plate or element; and Figs. 12 to 17 illustrate further modified pads for a modified form of the endless track in accordance with the embodiment illustrated in Figs. 1 to 3, the views shown corresponding to those illustrated by Figs. 6 to 11.

The terms "inner" and "outer" and related terms used hereinafter in the present description are to be construed as defining the relative locations of parts of the track considering the track mounted about the bogie wheels and sprockets of a self-laying track vehicle and the inner surface of the track that over which the bogie wheels run.

Referring firstly to Figs. 1 to 3 of the drawings, the endless track comprises a series of rigid metal track members or driving bars 45 preferably but not necessarily extending across and defining the full width of the track and alternating in the longitudinal direction of the track with two longitudinal series of ground-engaging pads 46 of rubber reinforced internally by flexible non-extensible tension members embedded therein, the pads 46 defining the depth of the track and being spaced to each side of the track median plane. The driving bars are provided centrally intermediate the two series of pads with drive-sprocket-co-operating formations 47 each flanked by a pair of longitudinally-disposed vertical guide plates 48.

The tension member embedded in and reinforcing each pad 46 comprises a three-link length 49 of triple-width roller chain, or other non-extensible reinforcement means such as the links 74 of the Fig. 4 embodiment to be described hereafter. The tension members are located towards those sides of the pads adjacent the centre of the track in the embodiment illustrated, and the track is designed for a self-laying track vehicle with a single series of bogie wheels aligned with the sprockets and which run between the guides 48. Connecting blocks or tension-absorbing members 50 and 51 are hingedly secured to the ends of each chain length at 52. The connecting blocks 50 and 51 are identical and inter-changeable but each is reversed relative to the other so that they overlap one another and fit together between successive pads. Each block is formed in its surface which overlaps the other with a projection 53 and an adjacent corresponding recess so that, when they are in overlapping and interfitting relationship, the projection of each fits into the recess of the other and are in contact with one another whereby the blocks are interengagingly keyed together.

The projections 53 and associated recesses do not extend the full width of the connecting blocks 50 and 51 so that the blocks when overlapped are interengagingly keyed together or interlocked against displacement both in the longitudinal and lateral directions. Each block is formed on its surface remote from the other when overlapped with a pair of laterally spaced similar projections of square or other rectilinear formation in plan view, the projections on the outer blocks 50 being denoted 54 and those on the inner blocks 51 being denoted 55 for clarity of description.

The track members or driving bars 45 overlap the connecting block assemblies 50, 51 and are provided with recesses 56 complementary to the projections 55 of the inner connecting blocks 51. The depth of the driving bars 45 and the spacing of the tension members 49 from the inner surfaces of the pads 46 are such that the inner surfaces of the driving bars and of the pads are level with one another and effectively form continuations one of the other alternately and provide on each side of the track median plane a pair of substantially continuous surfaces intermittently but insignificantly interrupted between each driving bar and pad where the faces of the pads are slightly bevelled at 57 to allow for the inner surfaces of the driving bars and pads being drawn closer together as the track moves round the driving sprocket and the idler sprocket or drum at opposed ends of the vehicle.

In the present embodiment of the invention each driving bar 45 forms the major part of a box-like construction wherein the overlapping connecting blocks 50 and 51 of the two adjacent pads of each series are interengagingly locked. The other part of the box construction comprises a flat tension plate 58 which engages over the outer side of the connecting block assemblies 50, 51 and is provided with recesses 59 complementary to the projections 54 of the outer connecting blocks 50, the spacing of the plates from the driving bars necessary to provide openings 60 through which the connecting block assemblies extend being effected by a deepening of the driving bars at each end thereof at 61 and by the depth of the central drive-sprocket-co-operating formations 47.

The driving bars 45 are of reduced width in the region of the drive-sprocket-co-operating formations 47 and the plates 58 may be similarly of reduced width centrally at 62 to correspond therewith.

Each sandwich-like assembly of driving bars 45, connecting blocks 50 and 51, and tension plate 58 when interengagingly fitted together is thus locked against movement either in the lateral or the longitudinal direction by the interlocking or keying together of the various parts through the medium of the projections and recesses, and the assembly is held together by six bolts 63 with co-operating nuts 64 and washers 65 and it will be manifest that these bolts are required to withstand tensile stresses only, as the shear stresses set up in running of the track are transmitted through the driving bars, the plates, the connecting blocks, and the block-interconnecting portions of the tension members, the connecting blocks thus fulfilling a tension-absorbing function. The bolt holes for four of the bolts extend centrally through the various projections and recesses, those for the remaining two bolts being at the ends of the box construction and passing through the parts 61 of the driving bar. The inner surfaces of driving bars are countersunk to accommodate the bolt heads 66 so that the latter do not project and mar the continuity of the surfaces. In the construction shown, which is designed for vehicles having one single series of bogie wheels as aforesaid, channels 67 equivalent in depth to the bolt heads are provided in the inner surface of each driving bar, extending laterally outwardly of each guideplate 48. Each bolt head is cut to provide a vertical face which abuts a vertical face of a channel 67, or, in the case of the central pair of bolts, the adjacent vertical face of a guide 48, thus positively locking the bolts against rotation about their axes.

The openings 60 in the driving bar box constructions extend the full width of the pads 46 and the latter are formed with rounded projections 68 of which those of each adjacent pair of pads enter into the opening 60 between the pads and may abut one another as shown in Fig. 2, in the section on the line A—A of Fig. 1, or may be spaced apart as indicated by the dotted lines in the same view. The rounded projections of the pads are held in position within the openings 60 by the locked connecting blocks 50 and 51, and take part in the relative hinging movements of the driving bar box constructions and the pads about the hinge axes 52, in effect providing extensions of said hinge axes.

Referring now to Figs. 4 and 5, the endless track construction therein shown is the same as that shown in and described with reference to Figs. 1 to 3 with the exceptions of the pad reinforcements or tension members and the connecting blocks or tension-absorbing means, and like reference numerals are applied to parts already described with reference to Figs. 1 to 3 and which fulfil precisely the same function in the modified construction of Figs. 4 and 5.

The part shown in section in Fig. 4 corresponds to the part of Fig. 2 which shows a section on the line C—C of Fig. 1, and it will be noted that the connecting blocks or tension-absorbing members of the modified construction do not overlap one another but instead abut one another. The modified block construction is best illustrated in Fig. 5 wherein it can be seen that the two blocks 70 are identical and are formed at their abutting faces each with two semi-circular openings which with those of the other provide circular openings 71 for passage of the bolts 63. Flanges 72 and 73 are provided at the abutting faces on the inner and outer surfaces of the blocks respectively, the flanges following the contours of the semi-circular openings. The abutting flanges 73 together snugly enter the recess 59a of a plate 58 and the flanges 72 together snugly enter the recess 56a of a driving bar 45 when the track is assembled, it being manifest that the recesses 59a and 56a are formed to correspond to and co-operate with the pairs of flanges 73 and 72 respectively. The tension member comprises three laterally-spaced links 74 which are hingedly interconnected with the connecting blocks at 52.

The driving bars 45 may be of metal or other rigid material of adequate strength and are preferably of a corrosion-and abrasion-resistant material of high heat conductivity such, for example, as aluminum-bronze, to obviate or mitigate deterioration on exposure in the open in inclement weather or under inclement conditions, and to disperse rapidly the heat generated in running of the tracks.

The tracks of Figs. 1 to 3 and Figs. 4 and 5 are capable of following the contour of the ground in a transverse direction, i. e. the tracks accommodate themselves to the surface of the ground over which they are being laid, the lower runs of the tracks where contacting the ground being capable of occupying a plurality of different planes simultaneously. It will be noted that the guide plates 48 are chamfered on their faces adjacent the vehicle bogie wheels to permit tilting of the lower run of the track about a central longitudinal axis.

Furthermore the tracks of the present invention are prevented from snaking, i. e. slipping in the lateral direction, by the interengaging keying or interlocking constructions at the pad and driving bar inter-connections.

The connecting blocks or tension-absorbing members of successive pads are integrated with one another and with the driving bars. The transversely-extending hinge axes where the pad reinforcements are interconnected with the connecting blocks provide for adequate movement of the pads and driving bars relative to one another for bending of the track about sprockets and drums and where necessary on the surface of the ground.

Disadvantages inherent in endless track and sprocket construction as applied to self-laying track vehicles and designed to operate in accordance with the principles of chain drives are that the rolling resistance, power consumption, pitch wear and track stretch are very high, resulting in short life and frequent adjustment of the track. So much so that it is a practice to commence with the pitch undersize to afford a greater life. The leading faces of the sprocket teeth have the task of thrusting the track around the sprocket, and, where the track is designed with single transverse hinge or pivot axes, intermediate successive pad, tread, or like track sections, considerable friction occurs between the sprocket co-operating formation and the leading faces of the sprocket teeth causing excessive wear on the mating faces and hinge pins, thereby rapidly increasing the pitch of the track and so causing the track to ride up the sprocket teeth and placing considerable strain on the track hinges. This strain may well result in local breakages or fracture in the track and certainly results in stretching of the track, a process which must be carefully watched lest the vehicle shed the track, an occurrence usually attended by serious consequences.

The foregoing disadvantages are mitigated in endless tracks in accordance with the present invention as there are two spaced, transverse hinges or pivot axes between adjacent driving bars and these axes are spaced one on each side of the centre line of each driving bar. This eliminates the frictional loss and consequent wear between the co-operating formation and sprocket teeth and so reduces the pitch wear, track stretch, power consumption and rolling resistance of the track. This lessens considerably the effort required to thrust the track around the sprocket and there is little tendency for the pitch to increase as a result of this action.

Referring now to Figs. 6 to 8 of the drawings, the pads 75 therein shown may replace the pads 46 of the track constructions shown in and described with reference to Figs. 1 to 5, except in that the tension members in this case are located towards those sides of the pads which will be remote from the centre of the track on assembly. As in the other constructions, the pads are internally reinforced by tension members embedded therein and each tension member comprises one or more longitudinally-extending links such as the links 74 (Figs. 4 and 5), or a length of roller chain such as the length 49 (Figs. 2 and 3), or other non-extensible reinforcement means. The tension members each include connecting blocks or tension-absorbing members 76 and 77 hingedly secured to the ends of the pad reinforcement, each for hingeing movement about a transverse axis, the locations of these axes being indicated at X (Fig. 6).

Each block 76 is provided on its inner surface with a projection 78 and each block 77 is provided on its outer surface with a recess 79 complementary to the projection 78, the recesses 79 and the projections 78 fitting interengagingly together when the track is assembled (cf. Figs. 2 and 4). The blocks 77, which are the inner blocks in the assembled track are provided on their inner surfaces with circular bosses 80 which are accommodated in complementary recesses in the driving bars, bolt holes 81 being provided in the connecting blocks for the bolts which hold together the sandwich-like assembly of driving bars, plates, and connecting blocks. It will be manifest that the connecting blocks 76 and 77 could be of the construction shown in Figs. 1 to 3, or in Figs. 4 and 5.

The pad of Figs. 6 to 8 is provided with a guide or element 82 which is of rubber and is preferably moulded integrally with the pad. The guides or elements 82 are aligned with the guides 48 on the driving bars 45 when the track is assembled, and thus the bogie wheels of the vehicle are flanked by a continuous succession of guides. Thus the track is positively guided along its entire length below the bogie wheels, and any tendency of the track to stray in the lateral direction, with possible consequent riding of the driving bar guides by the bogie wheels, is very considerably reduced.

As will be clearly apparent from Fig. 8 the guide elements 82 are designed to provide adequate strength, being thick at the base and the external wall thereof sloping towards the crest.

Laterally-directed cut-out parts or recesses 83 are provided in the outer surfaces of the pads 75, such recesses extending inwardly from the outer edges and improving adhesion of the pads with ground surfaces over which the track is laid.

The track pad illustrated in Figs. 9 to 11 is substantially identical with that shown in Figs. 6 to 8, and the same reference numerals have been utilised to indicate identical parts. In the pad of Figs. 9 to 11, however, the guide element 82 is reinforced by a metal insert comprising a vertical plate part 84 disposed longitudinally and projecting slightly both fore and aft of the pad, and mating into a circular recess on the driving bars thus providing a support for a part 85 embedded within the guide element 82 and shaped to follow the contour of the bogie-wheel-adjacent face of the latter. The toe of the part 85 may be extended to the face of the pad adjacent the track median plane.

The modified form of pad shown in Figs. 12 to 14 is for incorporation in an endless track designed for a self-laying track vehicle provided at each side with a single series of bogie wheels and fore and aft drums, one of which is engine-driven and is provided with twin toothed sprockets, one at or adjacent each of its ends. The driving bars are therefore formed with drive sprocket-co-operating formations at both lateral edges instead of a single central drive sprocket cooperating formation, but otherwise they are of exactly the same construction as hereinbefore described. The pads 86 of a single centrally-located series alternate with the driving bars, and this amounts, in effect, to the bringing together at the track median plane of the two series of pads of the embodiment described with reference to Figs. 6 to 8, there being no necessity to provide a central space for the passage of sprocket teeth. To eliminate repetition of description, therefore, parts shown in Figs. 12 to 14 are provided with the same reference numerals as similar parts in Figs. 6 to 8. Thus the pads 86 have two upstanding guide elements 87 for the vehicle bogie wheels and two internal longitudinal reinforcements or tension members each with end connector blocks or tension-absorbing members 76 and 77 the reinforcements or tension members being located adjacent the ends of the pads. Vertical plates 88 are embedded in the pad, being disposed centrally and longitudinally to provide local reinforcement. A transverse plate is, of course, provided for each driving bar and its associated two pairs of connector blocks extending from the two adjacent pads.

As shown in Figs. 15 to 17, the guide elements 87 on the pad 86 may be reinforced internally, and the reinforcements 89 of each pair of guide elements on a pad are preferably unitary with a central longitudinal reinforcement 90 which embraces the plates 88 and which projects slightly both fore and aft of the pad and mating into a circular recess on the driving bars.

The latter described track with the single series of pads is substantially lighter in construction than tracks previously provided or proposed for the same type of vehicle.

The guide elements on the pads prevent straying of the bogie wheels from the lane provided therefor on the inner surface of the track and thus prevent the track from being shed, thereby enabling sharper turns than normal to be negotiated speedily and safely by the vehicle. The guide elements on both the bars and the pads may project both fore and aft and be offset at one end to embrace or meet within the guide elements of the adjacent pad or bar as the case may be.

While the tracks described are driven tracks, it will be manifest that the invention is equally applicable to dead or non-driven tracks for trailer vehicles. The interengaging keying or interlocking constructions shown in and described with reference to the drawings are to be regarded as exemplary only and not limitative of the invention. Manifestly the keys or projections may be of wedge or other formation and the keyways or recesses be of corresponding configuration.

I claim:

1. An elongated flexible track adapted to be formed into an endless self-laying ground-engaging track for the support of a vehicle having a plurality of longitudinally spaced bogie wheels for load supporting and guiding engagement with said track, said track comprising a series of transversely-extending rigid driving bars each having inner and outer surfaces and transversely-extending edges, said inner surfaces each being flat at least across an area extending longitudinally between said edges; at least one series of aligned generally rectangular pads each formed of tough, resilient moisture-proof material and each having inner and outer surfaces, the former being flat at least across an area extending longitudinally thereof, each of said pads extending between two adjacent ones of said driving bars with said flat inner surface areas of both pads and driving bars forming at least one effectively flat substantially continuous but intermittently interrupted track surface adapted for load-supporting engagement with said bogie wheels; at least one flexible substantially non-extensible tension member embedded in each pad and extending longitudinally thereof intermediate the ends of said pad, the end portions of each said tension member comprising tension-absorbing means projecting from the ends of each said pad, each said tension-absorbing means interengagingly overlapping the outer surface of one of the two adjacent driving bars between which each said pad extends; and a plurality of detachable fastening means connecting said tension-absorbing means to said driving bars, whereby any of said driving bars or said pads may be individually removed from said track and replaced therein, and said detachable fastening means are not required to withstand shear stresses which would otherwise accompany running of said track.

2. An endless track as claimed in claim 1, in which pairs of guide elements are provided on the inner surfaces of the pads and the driving bars to flank each said effectively flat track surface where it traverses the pads and the driving bars, said guide elements extending inwardly beyond the surfaces of the pads and the driving bars and presenting substantially vertical spaced guide surfaces towards the bogie wheels.

3. An endless track as claimed in claims 2, in which the guide elements on the pads are internally reinforced.

4. An endless track as claimed in claim 3, in which the guide elements on both the bars and the pads project fore and aft and are offset at one end to flank on one side a surface of one adjacent guide element of the same longitudinal series.

5. An elongated flexible track adapted to be formed into an endless self-laying ground-engaging track for the support of a vehicle having a plurality of longitudinally spaced bogie wheels for load supporting and guiding engagement with said track, said track comprising a series of transversely-extending rigid driving bars each having inner and outer surfaces and transversely-extending edges, said inner surfaces each being flat at least across an area extending longitudinally between said edges; at least one series of aligned generally rectangular pads each formed of tough, resilient moisture-proof material and each having inner and outer surfaces, the former being flat at least across an area extending longitudinally thereof, each of said pads extending between two adjacent ones of said driving bars with said flat inner surface areas of both pads and driving bars forming at least one effectively flat substantially continuous but intermittently interrupted track surface adapted for load-supporting engagement with said bogie wheels; at least one flexible substantially non-extensible tension member embedded in each pad and extending longitudinally thereof intermediate the ends of said pad, the end portions of each said tension member comprising tension-absorbing means projecting from the ends of each said pad, adjacent ones of said tension-absorbing means of adjacent ones of said pads interengagingly overlapping one another over the outer surface of the driving bar between said pads; and a plurality of detachable fastening means connecting said tension-absorbing means to one another and to said driving bars, whereby any of said driving bars or said pads may be individually removed from said track and replaced therein, and said detachable fastening means are not require to withstand shear stresses which would otherwise accompany running of said track.

6. A track as claimed in claim 5, including complementary recess and projection features on and in the contiguous surfaces of the interengaging overlapped parts of said tension-absorbing means and said driving bars, thereby keying said parts together to interlock same in their interengaged relationship against movement relative to one another in all directions parallel to said effectively flat track surface, whereby said detachable fastening means is not required to withstand shear stresses in any direction.

7. An elongated flexible track adapted to be formed into an endless self-laying ground-engaging track for the support of a vehicle having a plurality of longitudinally spaced bogie wheels for load supporting and guiding engagement with said track, said track comprising a series of transversely-extending rigid driving bars each having inner and outer surfaces and transversely-extending edges, said inner surfaces each being flat at least across an area extending longitudinally between said edges, at least one series of aligned generally rectangular pads each formed of tough, resilient moisture-proof material and each having inner and outer surfaces, the former being flat at least across an area extending longitudinally hereof, each of said pads extending between two adjacent ones of said driving bars with said flat inner surface areas of both pads and driving bars forming at least one effectively flat substantially continuous but intermittently interrupted track surface adapted for load-supporting engagement with said bogie wheels; at least one flexible substantially non-extensible tension member embedded in each pad and extending longitudinally thereof intermediate the ends of said pad, the end portions of each said tension member comprising tension-absorbing means hingedly-connected about a transverse axis to the intermediate portion thereof and projecting from the ends of each said pad, each said tension-absorbing means interengagingly overlapping the outer surface of one of the two adjacent driving bars between which each said pad extends; a series of transversely-extending plates corresponding in number to said driving bars and disposed individually parallel to individual ones of the latter interengagingly across the driving bar remote surfaces of said tension members; and a plurality of detachable fastening means connecting together said tension-absorbing means, said driving bars and said plates whereby any of said driving bars or said plates or said pads may be individually removed from said track and replaced therein.

8. An elongated flexible track adapted to be formed into an endless self-laying ground-engaging track for the support of a vehicle having a plurality of longitudinally spaced bogie wheels for load supporting and guiding engagement with said track, said track comprising a series of transversely-extending rigid driving bars each having inner and outer surfaces and transversely-extending edges, said inner surfaces each being flat at least along a path extending longitudinally between its edges; a corresponding series of transversely-extending rigid tension plates each of which co-operates with one of said driving bars to provide one of a series of transversely-extending box-like driving bar assemblies each having at least one through opening extending longitudinally between and penetrating its front and rear faces; at least one series of aligned generally rectangular pads each formed of tough, resilient moisture-proof material and each having an inner surface flat at least along a longitudinally-extending area thereof and an outer surface, each of said pads extending between two adjacent ones of said driving bar assemblies with said flat inner surface areas of both pads and driving bars forming at least one effectively smooth substantially continuous but intermittently interrupted track surface adapted for load-supporting engagement with said bogie wheels; at least one flexible substantially non-extensible tension member embedded in each pad and extending longitudinally thereof intermediate the ends of said pad; the end portions of each said tension member comprising tension-absorbing means hingedly connected about a transverse axis to the intermediate portion thereof and projecting from the ends of each said pad, each said tension-absorbing means being accommodated within a said through opening of one of the two adjacent driving bar assemblies between which each said pad extends and fitting thereat in complementing relationship with the adjacent tension-absorbing means projecting from an adjacent pad of the series and accommodated within the same said through opening, and a plurality of detachable fastening means connecting said tension-absorbing means to said driving bar assemblies, whereby any of said driving bars or said pads may be individually removed from said track and replaced therein, and said detachable fastening means are not required to withstand shear stresses which would otherwise accompany running of said track.

9. A track according to claim 8, wherein each pair of tension-absorbing means accommodated in the same through opening in a driving bar assembly interengage each other and prevent relative movement therebetween in all directions parallel to said flat inner surface area on the driving bar of said assembly, and wherein said driving bar assembly comprises means for interlocking engagement with said pair of tension-absorbing means and connecting same therewith for preventing relative movement thereamong in all directions parallel to said flat inner surface area on the driving bar of said assembly, whereby said detachable fastening means is not required to withstand shear stresses in any direction during running of said track.

10. A track according to claim 9, wherein each pad is formed on its front and rear faces with a projection of rounded profile in the longitudinal direction and extending transversely of said tension-absorbing means projecting from each said face, said projections entering also said through openings and effectively forming extensions of the hinge axes of said tension-absorbing means.

11. An elongated flexible track adapted to be formed into an endless self-laying ground-engaging track for the support of a vehicle having a plurality of longitudinally spaced bogie wheels for load supporting and guiding engagement with said track, said track comprising a series of transversely-extending rigid driving bars each having inner and outer surfaces and transversely-extending edges, said inner surfaces each being flat at least along a path extending longitudinally between its edges; a corresponding series of transversely-extending rigid tension plates each of which co-operates with one of said driving bars to provide one of a series of transversely-extending box-like driving bar assemblies each having at least one through opening extending longitudinally between and penetrating its front and rear faces; at least one series of aligned generally rectangular pads each formed of tough, resilient moisture-proof material and each having an inner surface flat at least along a longitudinally-extending area thereof and an outer surface, each of said pads extending between two adjacent ones of said driving bar assemblies with said flat inner surface areas of both pads and driving bars forming at least one effectively smooth substantially continuous but intermittently interrupted track surface adapted for load-supporting engagement with said bogie wheels; at least one flexible substantially non-extensible tension member embedded in each pad and extending longitudinally thereof intermediate the ends of said pad; the end portions of each said tension member comprising tension-absorbing means hingedly connected about a transverse axis to the intermediate portion thereof and projecting from the ends of each said pad, each said tension-absorbing means being accommodated within a said through opening of one of the two adjacent driving bar assemblies between which each said pad extends and fitting thereat in interengaging overlapping relationship with the adjacent tension-absorbing means projecting from an adjacent pad of the series and accommodated within the same said through opening; each said driving bar assembly comprising means for interlocking engagement with said pair of tension-absorbing means accommodated therein and connecting same therewith for preventing relative movement thereamong in all directions parallel to said flat inner surface area on the driving bar of said assembly, and a plurality of detachable fastening means connecting said tension-absorbing means to said driving bar assemblies, whereby any of said driving bars or said pads may be individually removed from said track and replaced therein, and said detachable fastening means are not required to withstand shear stresses in any direction during running of said track.

No references cited.